United States Patent [19]

Lopez-Cepero

[11] 4,033,648
[45] July 5, 1977

[54] FISHING LURE RACK

[76] Inventor: Oscar E. Lopez-Cepero, 1700 Broadridge Ave., Stratford, Conn. 06497

[22] Filed: Jan. 26, 1976

[21] Appl. No.: 652,481

[52] U.S. Cl. .............................. 312/100; 312/248; 312/206; 211/89; 248/309 R
[51] Int. Cl.² .................. A47B 67/02; A47F 5/08
[58] Field of Search ... 312/100, 248, 206, DIG. 33; 248/309; 211/89, 60 T, 69

[56] References Cited

UNITED STATES PATENTS

| | | | |
|---|---|---|---|
| 1,711,327 | 4/1929 | Rock | 312/206 |
| 2,305,021 | 12/1942 | Meier | 211/69 |
| 2,403,825 | 7/1946 | Nissenbaum | 211/69 |
| 2,420,535 | 5/1947 | Griffin | 211/69 |
| 2,497,561 | 2/1950 | Rose | 312/248 |
| 2,584,644 | 2/1952 | Verdi | 211/89 |
| 2,593,042 | 4/1952 | Lynskey | 211/69 |
| 3,187,902 | 6/1965 | Nelson | 211/60 T |
| 3,337,058 | 8/1967 | Sandrick | 211/69 |
| 3,341,268 | 9/1967 | Bickford | 312/100 |
| 3,853,365 | 12/1974 | Nielsen | 312/206 |

FOREIGN PATENTS OR APPLICATIONS 782,506   2/1935   France .......................... 211/60 T

*Primary Examiner*—Paul R. Gilliam
*Assistant Examiner*—Victor N. Sakran
*Attorney, Agent, or Firm*—Mattern, Ware, Davis and Stoltz

[57] ABSTRACT

By providing a display and holding rack which is easily mounted to the gunwale, a bulkhead or the cockpit coaming of a boat and which incorporates a plurality of fishing lure retainers, a unique fishing lure rack is achieved which is readily accessible to the user to assure quick availability of all important fishing lures. In the preferred embodiment, a pivotable cover is mounted to the display rack and is movable from a closed position, surrounding the barb portions of the fishing lure hooks to protect against inadvertent snagging, to an open position in which the fishing lures can be quickly and easily removed.

2 Claims, 3 Drawing Figures

FIG. 1
FIG. 2
FIG. 3
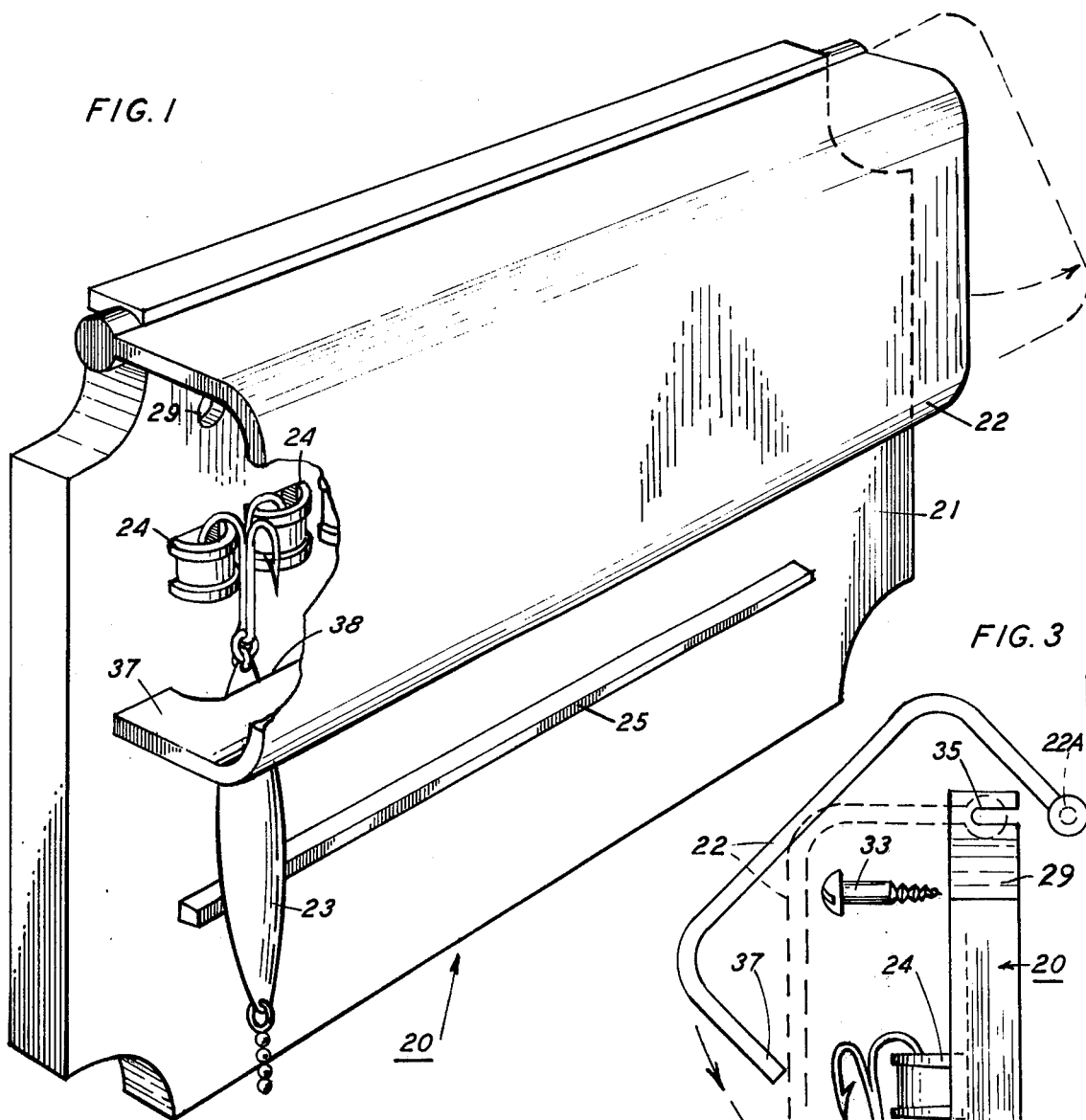
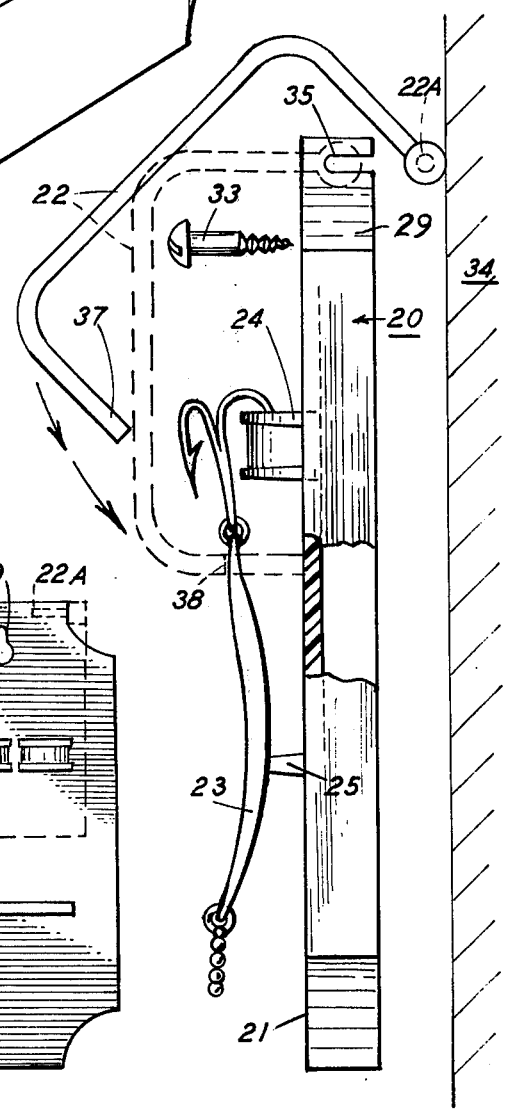
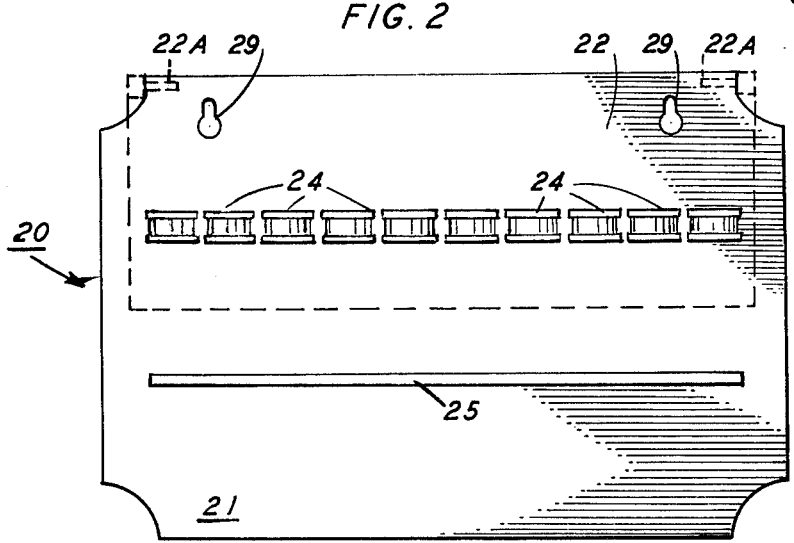

FISHING LURE RACK

BACKGROUND OF THE INVENTION

This invention relates to fishing lure storage-display racks and more particularly to fishing lure display racks for direct mounting to surfaces of the boat.

In the prior art, a plurality of various fishing lure containers have evolved with a variety of structural arrangements to provide maximum storage with some degree of availability. However, in these prior art containers, fishing lures tend to become entangled with each other, thereby preventing ready accessibility of a particular fishing lure when required. Furthermore, easy accessibility of any particular fishing lure is hampered since all of the fishing lures cannot be adequately displayed in a convenient position for quick and easy removal.

A further objection found with prior art fishing lure containers is the fact that the container cannot be positioned in a location where it is easily accessible to the fisherman during his fishing activities. Generally, the container must be positioned out of the way in order to prevent inadvertent kicking and spillage of the entire contents. As a result, when a fishing lure has to be quickly changed in order to assure catching that big fish that was just seen moving past the boat, prior art containers must be found, opened, the desired fishing lure discovered in the mass of other lures housed in the container, extracted from the mass of other lures, and finally secured on the line.

Therefore, it is a principal object of this invention to provide a fishing lure display and storage-rack which is positionable in the most advantageous location for immediate use.

Another object of this invention is to provide a fishing lure display and storage-rack incorporating the features defined above which is capable of holding all necessary lures individually for quick and easy removal from the rack.

Another object of this invention is to provide the fishing lure display and storage-rack incorporating the features defined above which is readily removable from its location for storage in a tackle box inside the boat's cabin, or in another secure location when not in use.

Other and more specific objects will in part be obvious and will in part appear hereinafter.

SUMMARY OF THE INVENTION

The fishing lure rack of the present invention eliminates all of the prior art difficulties by providing a substantially flat mounting plate which incorporates a plurality of fishing lure retainers secured thereto. The plate is easily mounted to a portion of the boat in a manner which allows the fishing lures to be removably secured individually in the fishing lure retainers. In this way, each fishing lure is individually suspended from its retained position on the side of the boat nearest the area where the fishing activity is conducted. As a result, any desired fishing lure can be easily and quickly removed from its retained position and rapidly secured onto the leader of the fishing line.

In the preferred embodiment, a pivotable cover is mounted to the plate for enclosing the barb portions of the fishing lures in order to prevent any inadvertent snagging contact therewith, while leaving uncovered the colorful, decorative lure and fly portions. When a fishing lure is required, the removable cover is easily and quickly moved from its closed position surrounding the fishing lures to an open position, exposing the fishing lures for quick and easy removal. If desired, the movable cover can be manufactured from translucent material in order to assure complete visibility of all fishing lures even when protectively enclosed by the pivotable cover.

The invention accordingly comprises an article of manufacture possessing the features, properties, and relations of elements which will be exemplified in the articles hereinafter described, and the scope of the invention will be indicated in the claims.

THE DRAWINGS

For a fuller understanding of the nature and objects of the invention, reference should be had to the following detailed description taken in connection with the accompanying drawing in which:

FIG. 1 is a perspective view of the fishing lure rack of the present invention;

FIG. 2 is a front elevation view of the fishing lure rack of the present invention; and FIG. 3 is a right end disassembled elevation view, partially in cross section, of the fishing lure rack of the present invention.

DETAILED DESCRIPTION

In FIG. 1, fishing lure rack 20 of the present invention is shown ready for mounting in a boat with a fishing lure 23 secured thereto. Fishing lure rack 20 comprises a mounting plate 21 and a movable cover 22 which is pivotably secured to plate 21. Plate 21 also incorporates a plurality of fishing lure retaining rings 24 and a spacer 25 for positioning fishing lure 23 in a convenient, readily accessible position.

In the preferred embodiment, pivotable cover 22 is manufactured from a translucent material in order to allow complete visibility of the fishing lures mounted in retaining ring 24. However, the use of translucent material is not required and any material can be employed for cover 22. If desired, fishing lure rack 20 may be manufactured without cover 22 incorporated at all, if such a construction is preferred.

In the preferred embodiment, plate 21 of fishing lure rack 20 comprises a substantially flat material incorporating keyhole slots 29 along the top edge thereof. keyhole slots 29 are employed for removably mounting fishing lure rack 20 to the side of the boat, as is more fully described below. Preferably, plate 21 is manufactured from plastic, such as injection-molded, high-impact polystyrene. However, any suitable material may be employed.

As best seen in FIG. 2, a plurality of lure retaining rings 24 are mounted to plate 21, preferably in a single row along the front of plate 21. In this way, fishing lures 23 can be securely held in retaining rings 24 by suspending the barbed portion of each fishing lure hook within retainer 24. As a result, the fishing lures are vertically suspended, ready for quick and easy accessibility.

In order to further enhance the quick accessibility of the fishing lures when mounted on fishing lure rack 20 of the present invention, a spacer bar 25 is also incorporated along the front of plate 21, spaced below and substantially parallel to the row of retaining rings 24. By employing spacer bar 25, the fishing lures 23 are maintained in a position spaced away from the surface of plate 21 in order to allow the fishing lure to be easily grasped by the fisherman and easily removed from its retained position, as best seen in FIG. 3. Spacer bar 25 also establishes a contact point for each of the fishing lures mounted on plate 21 which cooperates with cover 22 to securely hold the fishing lure without damaging the colorful, decorative lure and fly portion thereof. This cooperative holding arrangement is further described below in reference to FIG. 3.

In order to securely mount fishing lure rack 20 of the present invention to a convenient location in the boat, all that needs to be done is to position two screws 33 in a solid portion 34 of the boat in a manner so that each of the screws 33 will cooperate with a keyhole slot 29 of plate 21. Generally, the fishing lure rack 20 of the present invention is best mounted along the gunwale or cockpit coaming of the boat. Once screws 33 are in position, fishing lure rack 20 is easily secured in its retained position by aligning keyhole slots 29 with screws 33. By employing keyhole slots 29, fishing lure rack 20 can be positioned where desired in the boat; removed quickly and easily for safe storage in another location; and then quickly installed again in position on the boat during the next fishing trip.

As shown in FIG. 3, laterally facing pivot pins 22A of cover 22 cooperates with rearwardly open blind channels 35 of plate 21 in order to allow cover 22 to be easily removed from plate 21 if the cover is not desired. However, with pins 22A of cover 22 pivotably secured in channels 35 of plate 21, cover 22 is easily moved from its open position with the barbs of fishing lures 23 exposed to a closed position covering the barbs of fishing lures 23 in order to protect against any inadvertent contact with the barbs or hooks.

Since cover 22 is preferably C-shaped, extending from the top of plate 21 around the barbed hooks of lures 23 and finally contacting plate 21 just below the hooks of lures 23, with the remainder of the lure extending therebelow. Cover 22 incorporates plate contact arms 37 and a lure contact edge 38. As best seen in FIG. 3 where cover 22 is shown in phantom in its closed position, lure contact edge 38 cooperates with spacer bar 25 to grip and hold lures 23 in a securely retained arrangement where lure 23 is not capable of being violently moved in any direction, especially forwardly or rearwardly, due to the rolling or pitching movement of the boat, or external movement between mounting positions after the fishing trip. Consequently, the decorative, colorful, and delicate fly portions of the fishing lures are protected against inadvertent injury by unexpected jostling movement.

It will thus be seen that the objects set forth above, among those made apparent in the preceding description, are efficiently attained and, since certain changes may be made in the above article without departing from the scope of the invention, it is intended that all matters contained in the description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A fishing lure storage-display and holding rack for visibly mounting a plurality of lures on a supporting wall, comprising:
   A. a wall-plate member incorporating mounting means for removably mounting said wall-plate member to a suitable securing wall;
   B. a plurality of retaining members mounted to said plate in at least one aligned row for securely retaining portions of fishing lures, with the remainder of the lure depending vertically therefrom, with the fishing lures fully displayable;
   C. a spacer bar mounted to said rack below said retaining rings and substantially parallel thereto, for maintaining the vertically depending fishing lures spaced away from said plate for easy removal therefrom; and
   D. a cover member:
      a. pivotably secured to said rack and movable from a first open position, exposing the retaining rings for lure removal therefrom, to a second closed position surrounding and substantially completely enclosing the barb portions of any fishing lures mounted on said plate with the decorative portion of the fishing lure non-enclosed and fully viewable, and
      b. incorporating a lower edge having
         1. a lure contact portion positioned for co-operation with the spacer bar for maintaining stored fishing lures gripped between the spacer bar and the contact portion, retained on the rack in a secured position, and
         2. a rack abutting portion positioned for contact with the front surface of the wall-plate member and spaced away from the lure contact portion for assuring optimum positioning of the lure contact portion for secure tension without injuring the fishing lure decorative surfaces;

whereby said fishing lures are fully displayable and securely retained on said fishing lure display storage and holding rack for both esthetics and accessability.

2. The fishing lure storage-display rack defined in claim 1, wherein said plate incorporates keyhole mounting slots for quick and easy movable mounting of said plate to a convenient securing wall.

* * * * *